(12) United States Patent
Salmi (10) Patent No.: US 10,313,136 B2
(45) Date of Patent: Jun. 4, 2019

(54) METHOD AND A SYSTEM FOR VERIFYING THE AUTHENTICITY OF A CERTIFICATE IN A WEB BROWSER USING THE SSL/TLS PROTOCOL IN AN ENCRYPTED INTERNET CONNECTION TO AN HTTPS WEBSITE

(71) Applicant: ONLINE SOLUTIONS OY, Jyväskylä (FI)

(72) Inventor: Jyrki Salmi, Jyväskylä (FI)

(73) Assignee: ONLINE SOLUTIONS OY, Jyvaskyla (FI)

( * ) Notice: Subject to any disclaimer, the term of this patent is extended or adjusted under 35 U.S.C. 154(b) by 196 days.

(21) Appl. No.: 15/335,136

(22) Filed: Oct. 26, 2016

(65) Prior Publication Data

US 2017/0118029 A1    Apr. 27, 2017

(30) Foreign Application Priority Data

Oct. 26, 2015   (FI) ..................................... 20155763

(51) Int. Cl.
*G06F 21/00*   (2013.01)
*H04L 29/06*   (2006.01)
(Continued)

(52) U.S. Cl.
CPC ........ *H04L 9/3268* (2013.01); *H04L 63/0823* (2013.01); *H04L 63/123* (2013.01);
(Continued)

(58) Field of Classification Search
CPC ....... H04L 9/3268; H04L 63/18; H04L 67/10; H04L 63/123; H04L 67/02; H04L 67/42;
(Continued)

(56) References Cited

U.S. PATENT DOCUMENTS 6,304,974 B1   10/2001   Samar
9,143,504 B1   9/2015   Shi et al.
(Continued)

FOREIGN PATENT DOCUMENTS

EP   2854365 A1 *  4/2015   ......... H04L 63/0428

OTHER PUBLICATIONS

Martin Georgiev, Subodh Iyengar, Suman Jana, Rishita Anubhai, Dan Boneh, Vitaly Shmatikov; "The most dangerous code in the world: validating SSL certificates in non-browser software"; Oct. 2012; CCS '12: Proceedings of the 2012 ACM conference; Publisher: ACM; pp. 38-49 (Year: 2012).*

(Continued)

*Primary Examiner* — Kendall Dolly
*Assistant Examiner* — Courtney D Fields
(74) *Attorney, Agent, or Firm* — FisherBroyles, LLP; Robert Kinberg (57) ABSTRACT

A method for verifying the authenticity of a certificate in a web browser using an SSL/TLS protocol in an encrypted Internet connection to an HTTPS website includes establishing an encrypted connection to the HTTPS website using the web browser on a user's terminal device. A certificate including a public key of the HTTPS website and signed by a trusted certificate authority is sent to the user's web browser from the web server using the Internet connection. The certificate authority that signed the certificate is compared against the list of trusted certificate authorities. The certificate authority is verified as being included in the list. The thumbprint of the certificate is sent as an additional security check key using a second messaging channel, external to the Internet connection between HTTPS website and web browser of the user's terminal device, and the contact data in the customer register. The additional security (Continued)

check key is compared with the thumbprint received by the web.

12 Claims, 9 Drawing Sheets

(51) Int. Cl.
*H04L 29/08* (2006.01)
*H04L 9/32* (2006.01)
*H04L 12/66* (2006.01)

(52) U.S. Cl.
CPC ............... *H04L 63/18* (2013.01); *H04L 67/02* (2013.01); *H04L 67/10* (2013.01); *H04L 67/42* (2013.01); *H04L 63/0428* (2013.01); *H04L 63/168* (2013.01); *H04L 2463/082* (2013.01)

(58) Field of Classification Search
CPC ............... H04L 63/0823; H04L 63/168; H04L 63/0428; H04L 2463/082
See application file for complete search history.

(56) References Cited

U.S. PATENT DOCUMENTS

2004/0268142 A1* 12/2004 Karjala ............... H04L 63/0272
726/15
2010/0031041 A1* 2/2010 Cohen ................. H04L 63/1441
713/168

OTHER PUBLICATIONS

Fingerprints: Is your employer, school, or Internet provider eavesdropping on your secure connections? [Available Online]. https://web.archive.org/web/20150905141813/https://www.grc.com/fingerprints.htm [Published: May 9, 2015 Retrieved: Apr. 5, 2016].
Claessens, J. et al., "On the Security of Today's Online Electronic Banking Systems", Computers & Security (2002) vol. 21, No. 3, pp. 257-269.
Search Report for Finnish Application No. FI20155763, dated Sep. 23, 2016.

* cited by examiner

METHOD AND A SYSTEM FOR VERIFYING THE AUTHENTICITY OF A CERTIFICATE IN A WEB BROWSER USING THE SSL/TLS PROTOCOL IN AN ENCRYPTED INTERNET CONNECTION TO AN HTTPS WEBSITE

CROSS-REFERENCE TO RELATED APPLICATION

This application claims priority to Application No. 20155763 filed in Finland on Oct. 26, 2015, the disclosure of which is incorporated herein by reference in its entirety.

FIELD OF THE INVENTION

The invention relates to a method for verifying the authenticity of a certificate in a web browser using the SSL/TLS (Secure Socked Layer/Transport Layer Security) protocol in an encrypted Internet connection to an HTTPS (Hypertext Transfer Protocol Secure) website, wherein a web server of the HTTPS website has a certificate provided with a thumbprint, issued by a certificate authority and the server has registered contact data of a user in a customer register and the web browser has a list of trusted certificate authorities, wherein the authenticity of the certificate is verified taking the following steps:
  establishing a connection to a website placed on a web server using a web browser on a user's terminal device using an Internet connection,
  sending a certificate, including a public key of the website, signed by the certificate authority to the user's web browser from the web server using an Internet connection,
  comparing the certificate authority that has signed the received certificate against the list of trusted certificate authorities embedded in the web browser and
  verifying that the certificate authority is included in the list.

The invention also relates to a corresponding system.

BACKGROUND OF THE INVENTION

SSL certificates are commonly used to verify the authenticity of encrypted https websites. SSL certificates are proofs of the authenticity of a website issued by trusted entities. They are used to confirm that the browser is communicating with an authentic website. A certificate authority issuing SSL certificates verifies the authenticity of a website directly with the owner of the website address and by utilizing other sources of information.

An SSL certificate is created by generating a public key and a private key for the website that are placed on a web server for the identification of the website, and the public key of the website and a request message signed with the private key of the website are sent using an Internet connection from the web server to the certificate server of a certificate authority that issues certificates. The certificate authority may also have a separate server computer detached from the Internet connection to which the request message can be delivered for signing using, for example, a memory stick. The certificate is created on the server of the certificate authority by signing the certificate using the private key of the certificate authority, and finally, the certificate is sent from the certificate authority's server to the web server. A check sum representing a unique thumbprint of the certificate can be calculated at any time for the certificate.

Figure 1:
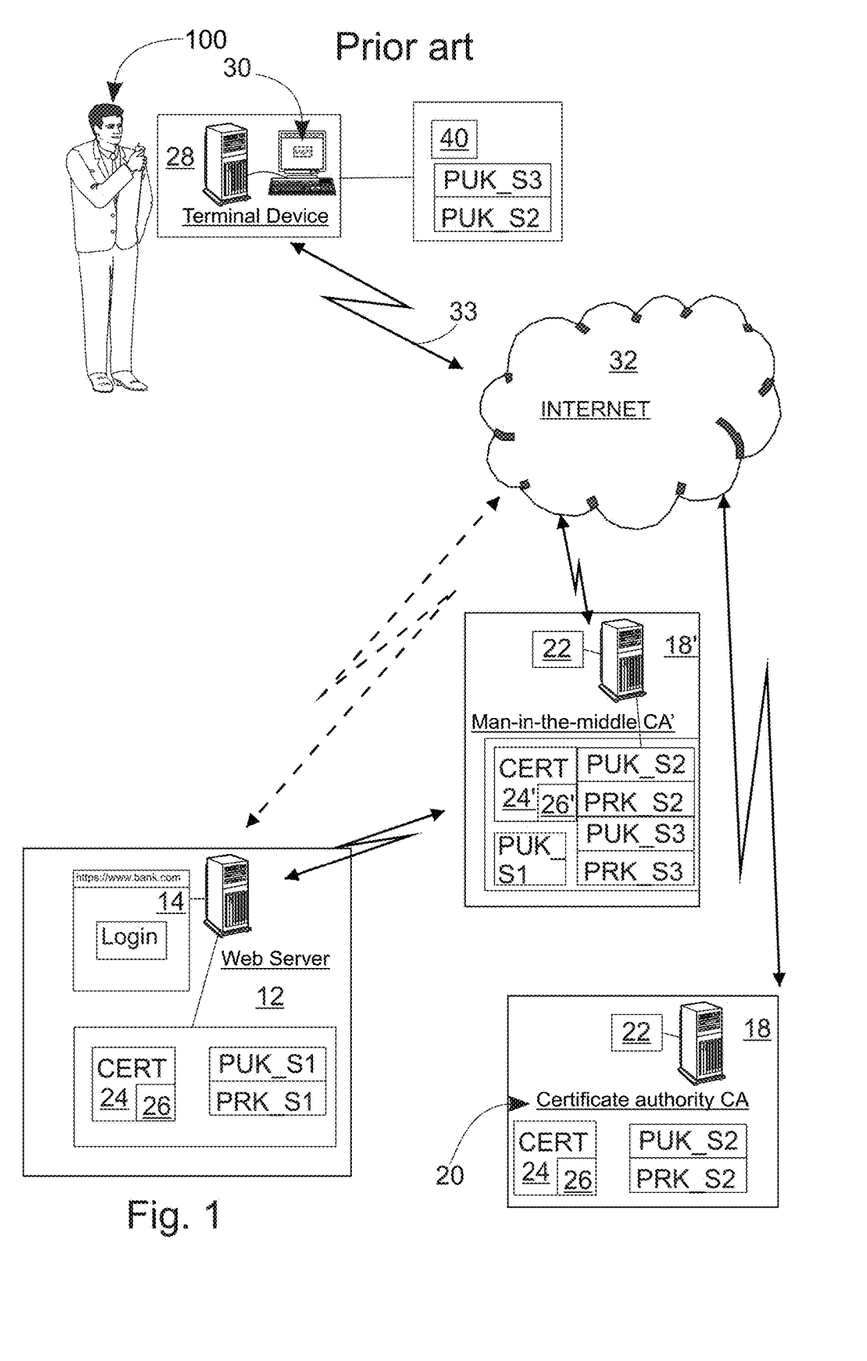
FIG. 1 is a basic view of a system according to prior art.

According to a prior art system illustrated in FIG. 1, when a user 100 starts using a website 14 that applies the SSL/TLS protocol, the web browser 30 on the terminal device 28 of the user 100 sends a request to a web server 12 to deliver a certificate 24 via an Internet connection 32 for verifying the authenticity of the website 14. The web server 12 sends the certificate 24 to the web browser 30 of the user 100 via the Internet connection 32, and the web browser 30 compares the certificate authority 20 that has signed the certificate 24 against the list 40 of trusted certificate authorities 20 embedded in the web browser 30. If the certificate authority 20 is found in the list 40, the web browser 30 allows the user 100 to continue the login, for example; otherwise, the web browser 30 shows the user 100 a warning of an untrusted certificate 24 or of a problem related to the certificate 24. In this case, the user 100 can choose to exit the website 14 avoiding an encrypted connection with a possibly hijacked website 14 or connection. The authenticity of the SSL certificate is verified each time when a website using the SSL/TLS protocol is connected, i.e. upon each click.

However, a problem with this type of authenticity verification is that the user must trust the certificate authority 20 that has issued the SSL/TLS certificate. If, for some reason, the private key PRK_S2 of the certificate authority 20 has leaked from the certificate authority 20 to fraudulent entities, i.e. a mediator (also known as a man-in-the-middle) 18', this mediator 18' can create a fake certificate 24' using the private key PRK_S2 in such a way that it seems for the user 100 and the web browser 30 like a completely authentic certificate 24 coming from the website 14. This is because the authenticity verification of the certificate 24 performed by the web browser 30 determines that the certificate authority 20 that has issued the certificate 24 is included in the list 40 of trusted certificate authorities embedded in the web browser. SSL/TLS connection could be taken over by the mediator 18' by capturing the certificate 24 sent by the website 14 to the user 100, as well as the public key PUK_S1 contained in it. After this, the mediator 18' creates a new key pair with a private key PRK_S3 and a public key PUK_S3 and creates a fake certificate 24' by signing it with the private key PRK_S2 of a valid certificate authority 20 it has acquired somehow. This fake certificate 24' includes the public key PUK_S3 generated by the mediator 18'. Finally, the mediator 18' delivers the fake certificate 24' containing the new public key to the web browser 30 of the user 100. The web browser 30 of the user 100 checks that the certificate authority 18 that has signed the certificate is found in the list 40 of trusted certificate authorities, and cannot detect the falsity of the fake certificate 24' based on the public key in it. When the user 100 encrypts the connection with the new public key PUK_S3 delivered by the mediator 18', the mediator 18' can open the messages with the new private key PRK_S3 generated by the mediator, read the data and re-encrypt it with the public key PUK_S1 of the website 14, and then the web server 12 also assumes that the encrypted data is coming directly from the web browser 30 of the user 100.

In this context, it should be understood that instead of a normal computer hacker, the mediator may be a government entity who gains access to the private key of the certificate authority by exercising its own authority or coercive power.

SUMMARY OF THE INVENTION

The object of the invention is to provide a method that is more reliable than prior art methods for verifying the authenticity of a certificate. Another object of the invention is to provide a system that is more reliable than prior art systems for verifying the authenticity of a certificate.

This object can be achieved with a method for verifying the authenticity of a certificate in a web browser using the SSL/TLS protocol in an encrypted Internet connection to an HTTPS website, wherein a web server of the HTTPS website has a certificate provided with a thumbprint, issued by a trusted certificate authority and the server has registered contact data of a user in a customer register and the web browser has a list of trusted certificate authorities. The authenticity of a certificate is verified taking the following steps, wherein an encrypted connection is established to the HTTPS website placed on the web server with an Internet connection as the first messaging channel using a web browser on the user's terminal device, a certificate, containing the public key of the HTTPS website, signed by a trusted certificate authority, is sent to the user's web browser from the web server using an Internet connection, and the certificate authority that has signed the certificate is compared against the list of trusted certificate authorities embedded in the web browser and it is verified that the certificate authority is found in this list. Furthermore, in the method, the thumbprint of the certificate is sent as an additional security check key from the web server using a second messaging channel, detached from the Internet connection between HTTPS website and web browser of the user's terminal device, and a customer register. This thumbprint is compared with the thumbprint of the certificate received by the web browser from the web server using an Internet connection for verifying the authenticity of the certificate.

In the method according to the invention, the unique thumbprint of the certificate is sent via a second channel detached from the Internet connection so that a mediator that has possibly taken over the traffic passing the Internet connection is detected by comparing the thumbprint of the certificate delivered via the second channel with the thumbprint computed from the certificate received via the Internet connection. Even though the mediator would have possession of a private key of a trusted certificate authority, the mediator must create a new fake certificate, which corresponds to the mediator's own public key. In this way, the mediator can act as an authentic website and capture the messaging traffic unencrypted. The fake certificate containing the mediator's own public key deviates from the authentic certificate regarding the content and thus, the fake certificate also deviates from the thumbprint of the authentic certificate regarding its thumbprint, although the mediator can use the private key captured from a trusted certificate authority and act as authentic website.

Advantageously, the certificate is created in a method taking the following steps, wherein a public key and a private key are generated for a website placed on a web server for the identification of the website, the public key of the website and at least one piece of identification data of the website are sent from the web server as a request message signed with the private key of the website to the certificate server of the certificate authority and a request message is received by the certificate server and the validity of the identification data is checked. In addition, during the creation of a certificate, a certificate is advantageously created on the certificate server of the certificate authority by signing a request message with the private key of the certificate authority and the certificate is sent from the certificate server of the certificate authority to a web server. Thus, the certificate consists of the public key of the website, data of the website possessor and the signature of the certificate authority with the private key of the certificate authority. The thumbprint of the certificate can be created as a cryptographic hash for all information contained in the certificate so that any changes to this information will change the thumbprint in such a way that the change is detectable.

Advantageously, a user login/authentication process with two phases is used in the method, wherein the first phase (or step) of the process is completed before the authenticity verification of the certificate with the certificate thumbprint in the second phase (or step) only after completing the verification of authenticity of the certificate. This means that although the user logs in to a fake website during the first phase of the login/authentication process, after verifying the authenticity of the certificate, they will not insert the password related to the second phase of the login process unless the certificate is authentic. In this way, the mediator will not get hold of all user passwords required for a complete login/authentication.

According to an embodiment, a mobile phone network is used as the second messaging channel. With a mobile phone network, the second channel external to the Internet connection can be reliably formed, and today, the web browser used by the user is also often located in the same smartphone. Eavesdropping a mobile phone network requires separate arrangements, and it would be necessary to manipulate the traffic of the mobile phone network to trick the user.

Advantageously, an additional security check key is sent to the user's mobile phone as a mobile phone network message after the user has logged in. The use of a mobile phone network message, i.e. a text message, is quick and easy and can be completely automated.

In the method, the user advantageously logs in to a website and the signed-up user is identified. Thus, it will be known to which user and to which mobile phone network subscriber connection the additional security check key is to be sent as a mobile phone network message.

According to another embodiment, a traditional physical mail delivery is used as the second messaging channel. Capturing a mail delivery requires physical presence of the mediator near the user's domicile or the website possessor's domicile.

Advantageously, the additional security check key is sent to the user as a mail delivery as part of a key code list, which is required for the user to log in to a website. In this way, during the login process, the user can simultaneously look up the login password and check the thumbprint of the certificate.

Advantageously, when using a traditional mail delivery, the additional security check key is sent to the user immediately upon registration, prior the user establishing an SSL/TLS connection to the website.

According to a third embodiment a software application separate from the web browser is used as second messaging channel. This makes it possible to use a so called "password-application" for confirming the login to the website and the thumbprint of the certificate of the website is presented in the application. The thumbprint information can be updated in the application regularly or the application could be required to be reinstalled regularly when the certificate and therefore also the thumbprint of the website changes.

The object of the system according to the invention can be achieved with a system for verifying the authenticity of a certificate in a web browser using the SSL/TLS protocol in an encrypted Internet connection with an HTTPS website, said system including a user's terminal device comprising a web browser for browsing HTTPS websites, a web server for maintaining an HTTPS website, said web server having a public key and a private key of the HTTPS website for the identification of the HTTPS website, a certificate with a unique thumbprint generated by a certificate authority, and a customer register for storing contact data of users independent of the Internet connection between HTTPS website and web browser of the user's terminal device. The web server is arranged to send a certificate including the public key and signed by the certificate authority to the web browser on the user's terminal device. The system further includes an encrypted Internet connection for connecting the web server to the web browser on the user's terminal device and vice versa as two phase messaging channel, as well as a second messaging channel external to the Internet connection. The web server is arranged to send an additional security check key to the user based on the customer register along the second messaging channel. In the system, the additional security check key is accompanied by a certificate thumbprint for verifying the authenticity of the certificate. The contact data of users is related to the second messaging channel. In the system according to the invention, the use of a second messaging channel enables the delivery of the certificate thumbprint from the website possessor to the website user via a second route, which makes the mediator's action notably more difficult. Henceforth, all references to a website will always mean HTTPS websites.

In other words, if a thumbprint of a certificate received via an Internet connection does not match with the thumbprint of the certificate received via the second messaging channel, the certificate is not authentic, but fake, in which case the user should stop the use of the connection take necessary action to report the possible breach of certificate authority private keys.

According to another embodiment, the other messaging channel is a mobile phone network. A mobile phone network is as such an encrypted channel, via which an additional security check key can be quickly and reliably delivered to the user using a second channel external to the Internet connection. In addition, the web browser used by the user can in some cases be located in the same smartphone. Eavesdropping a mobile phone network requires separate arrangements, and it would be necessary to further manipulate messages in the mobile phone network to provide fake thumbprint information to the user.

The system may further include a modem arranged in association with the web server for sending a mobile phone network message that includes an additional security check key from the web server to the user's mobile phone network terminal device. In this way, the system can be automatically implemented.

Advantageously, the additional security check key is sent to the user's mobile phone as a mobile phone network message. The use of a mobile phone network message, i.e. a text message, is quick and easy and can be completely automated.

Advantageously, the web server includes software means for sending the thumbprint of the certificate stored in its memory with a modem as a mobile phone network message to the user's mobile phone network terminal device utilising a customer register. In this way, the system can operate automatically.

Advantageously, in addition to the thumbprint of the certificate, the user is provided with a one-time login password in a mobile phone network message. This further improves the level of data security.

Advantageously, the second messaging channel is a traditional mail delivery. Unlike a takeover of data communications, taking over a mail delivery requires physical action.

An additional security check key may be formed in a key code list, which is required for the user to log in to a website. With the key code list, the certificate thumbprint functioning as an additional security check key can always be delivered to the user without any extraordinary trouble every time the key code list is renewed.

Advantageously, the system also includes a user's terminal device comprising a web browser and a list of trusted certificate authorities embedded in the web browser, these certificate authorities including at least one nominated trusted certificate authority and its public key.

According to a third embodiment the system comprising a second server connected to said web server and a software application separate from the web browser wherein said second server and said software application are arranged to form a second messaging channel. This makes it possible to use a so called "password-application" for verifying the login in to website and presenting the thumbprint of the website certificate from the second server using a second messaging channel. Eavesdropping two messaging channels at the same time requires separate arrangements, and it would be also necessary to further manipulate messages in the encrypted connection between the software application and the second server to provide a fake thumbprint for the user.

Preferably the system comprising a second terminal device of the user for storing and using of said software application. If the web browser and the software were both located on the same terminal device, a security breech on that terminal device might enable hackers to provide fake information in both messaging channels.

The method and the system according to the invention can also be used with the so-called self-signed certificates, wherein the certificate has not been signed with the private key of a trusted certificate authority but with a private key corresponding to the public key included in the certificate. By using a second messaging channel for sending the additional security check key, the level of data security can also be raised in cases where a trusted certificate authority is not used.

The method and the system according to the invention offer an advantageous means to improve data security in connection with https websites applying the SSL/TLS encryption protocol. Application of the method and the system according to the invention can be started in already existing systems in a very simple way, for example, by only adding the thumbprint of the certificate of the website as additional data in the key code list of an online bank and by publishing information for the users on how to display the thumbprint of the web browser certificate in the web browser. In other words, the method and the system according to the invention can be implemented without a need to install separate applications in the user's terminal device, which facilitates the use of the method and the system. The method and the system according to the invention differ from prior art methods and systems in that, according to the invention, it is strived to verify the authenticity of both the website and the user identity, whereas in prior art systems, it is strived to only verify the authenticity of the user's identity.

BRIEF DESCRIPTION OF THE DRAWINGS

The invention is described below in detail by referring to the appended drawings that illustrate some of the embodiments of the invention, in which.

DETAILED DESCRIPTION OF THE INVENTION

Figure 2A:
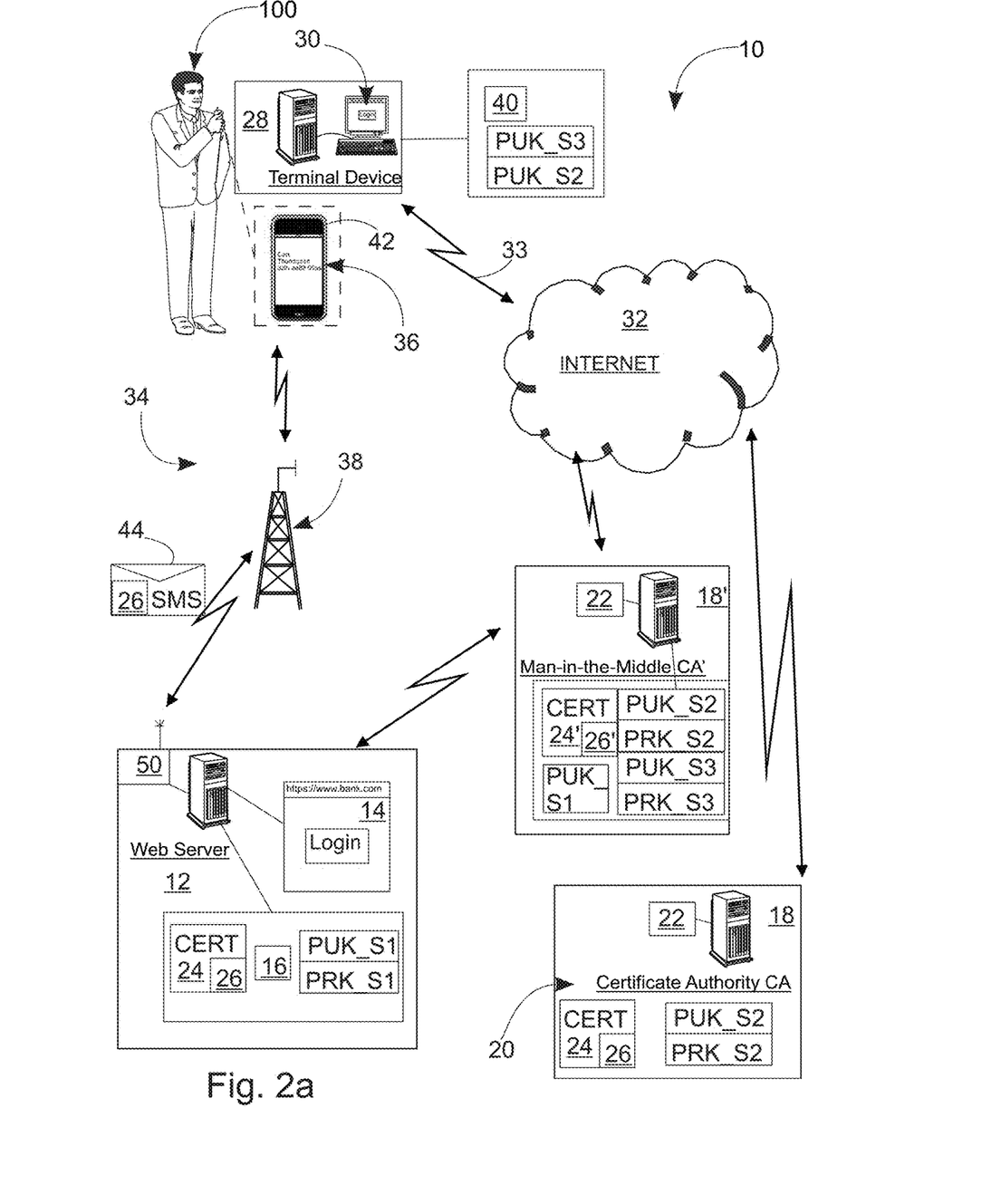
FIG. 2a is a basic view of a first embodiment of the system according to the invention.

FIG. 2a illustrates a first embodiment of the system 10 according to the invention, wherein a mobile phone network 38 is used as the second messaging channel 34. In this embodiment, the system 10 includes a web server 12, an Internet connection 32 forming the first messaging channel 33 and a mobile phone network 38 forming the second messaging channel 34. In addition, the system advantageously includes a terminal device 28 for the user 100 comprising a web browser 30, and a second terminal device 42 for the mobile phone network 38 of the user 100, i.e. advantageously a mobile phone.

The web server 12 is meant for maintaining a secure website 14 of a bank, for example. In this context, a secure website means a website according to the HTTPS protocol wherein the SSL/TLS security protocol is used in handshaking between the user's web browser and the website. The web server 12 has the public key PUK_S1 and the private key PRK_S1 of the website 14 stored in its memory for encryption and a customer register 16 for users 100 registered in the website 14. The public key PUK_S1 and the private key PRK_S1 are generated according to a prior art method using a technique applied in the RSA encryption, wherein both keys are large random numbers and form a pair of numbers. The web server may be a completely normal server computer with a necessary software for maintaining the website, as well as a memory for storing the encryption keys and the customer register.

The certificate server 18 issuing the certificate on the web server 12 of the system according to the invention is meant for maintaining a certificate authority 20; that is, for maintaining reliable service that issues certificates for companies and their websites as a proof that the website concerned actually belongs to the company concerned. The certificate server can also be a normal server computer having the public key PUK_S2 and the private key PRK_S2 of the certificate authority 20 stored in its memory for the signing of the certificate. The certificate server also includes software means 22 for generating a certificate 24 using the public key PUK_S1 of the website 14 and the private key PRK_S2 of the certificate authority 20. The software means 22 are also arranged to perform a check based on a certificate signing request (CSR) message sent by the website 14. During the check, information of the website possessor included in the request message is compared with the public data regarding the possessor maintained by authorities and the authenticity of the website possessor is verified based on this. The process related to the creation of a certificate is described in more detail later.

The terminal device 28 of the user 100 that is advantageously used in the system 10 may be, for example, a personal computer according to FIG. 1 comprising a web browser 30. Alternatively, the terminal device can be a smartphone, a tablet or another similar terminal device with a user interface, capable of establishing an Internet connection. Advantageously, the user interface is graphic, such as the user interfaces of computers or tablets. The web browser 30 includes a list 40 of trusted certificate authorities 20, including at least one nominated trusted certificate authority 20 and its public key PUK_S2. The web browser may be, for example, Google Chrome, Mozilla Firefox or Internet Explorer, which are suitable for downloading and displaying HTTPS websites. Generally, a list of trusted certificate authorities is included in the data of each web browser and the list contains a notable number of certificate authorities that are commonly known, as well as their public keys. Generally, the list and the public keys are generated in the web browser already during the installation of the web browser. Furthermore, the list of trusted certificate authorities can be updated, if the user accepts or rejects certificates issued by a certain certificate authority.

In this context, it should be understood that the keys PUK_S3 and PUK_S2 drawn, for example, in association with the terminal device 28 of the user 100 in FIGS. 1a-3 are stored in the terminal device and are available there when necessary. Correspondingly, the keys drawn in association with the certificate server and the web server are also stored in their respective memories. In addition, the list of trusted 1s certificate authorities is a separate list stored in the terminal device that also includes the public key PUK_S2 of the certificate authority. The list does not include the key PUK_S3.

The first messaging channel 33 of the system according to the invention is composed of an Internet connection 32, with which the web server 12 and the terminal device 28 of the user 100 are connected to each other. For example, the Internet connection may be an optical cable connection, a mobile connection created via a mobile phone network or another similar Internet connection. Advantageously, according to FIG. 3, the data transfer between the web server 12 and the certificate server 18 takes place using the Internet connection. The certificate server may use a separate computer that is not connected to the Internet, wherein a CSR request received via the Internet connection is processed and signed. In this way, it is possible to guarantee data security when issuing a certificate.

According to the invention, in addition to the Internet connection 32, the system 10 includes a second messaging channel 34 external to the Internet connection 32 for sending an additional security check key 36 from the web server 12 to the user 100 based on the customer register 16. In practice, this second messaging channel 34 external to the Internet connection 32 may be a mobile phone network 38 according to the first embodiment of FIG. 2a or a mail delivery 46 according to the second embodiment of FIG. 2b. These are the forms of the second messaging channel that are most easily implementable; however, the second messaging channel can basically also be formed by a direct visual contact with the user, for example. In this case, the user is provided with the thumbprint used on the website as a paper copy when the user visits the website possessor. According to the invention, the additional security check key 36 comprises the thumbprint 26 of the certificate 24 for comparing it with the thumbprint 26 of the certificate 24 received by the web browser 30 via the Internet connection 32 from the web server 12 for verifying the authenticity of the certificate 24.

Figure 4A:
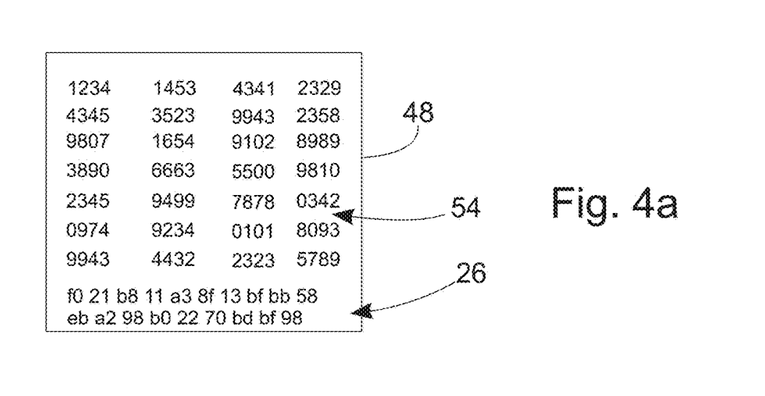
FIG. 4a illustrates a key code list used in an application of the second embodiment of the system according to the invention.

For example, the thumbprint 26 may be a certificate-specific hexadecimal number, which is illustrated in the embodiment of FIG. 4a. The certificate 24 is uniquely created during the steps related to its generation by using the public key PUK_S1 of the website and the information that uniquely identifies the online service and by signing it with the private key PRK_S2 of the certificate authority according to FIG. 7. Based on the information included in the certificate, a cryptographic hash, which is the thumbprint of the certificate, is generated. The steps of the method according to the invention and the creation of a certificate are described in more detail below.

Figure 3:
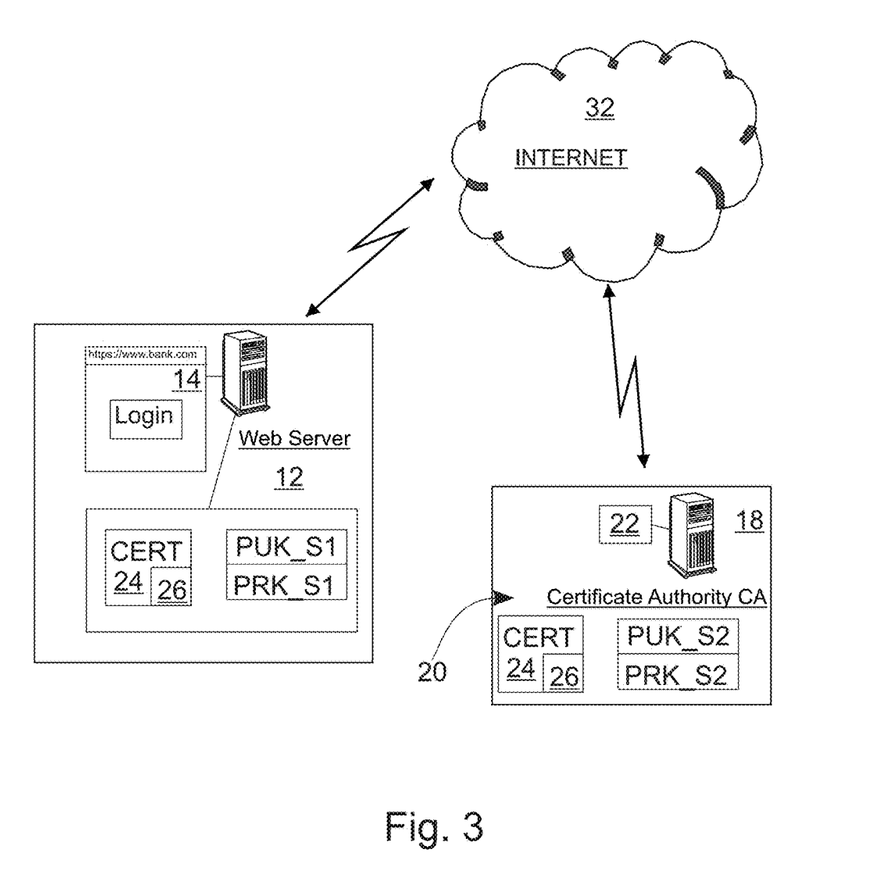
FIG. 3 illustrates the part of the system according to the invention that is needed for creating a website certificate.
Figure 5:
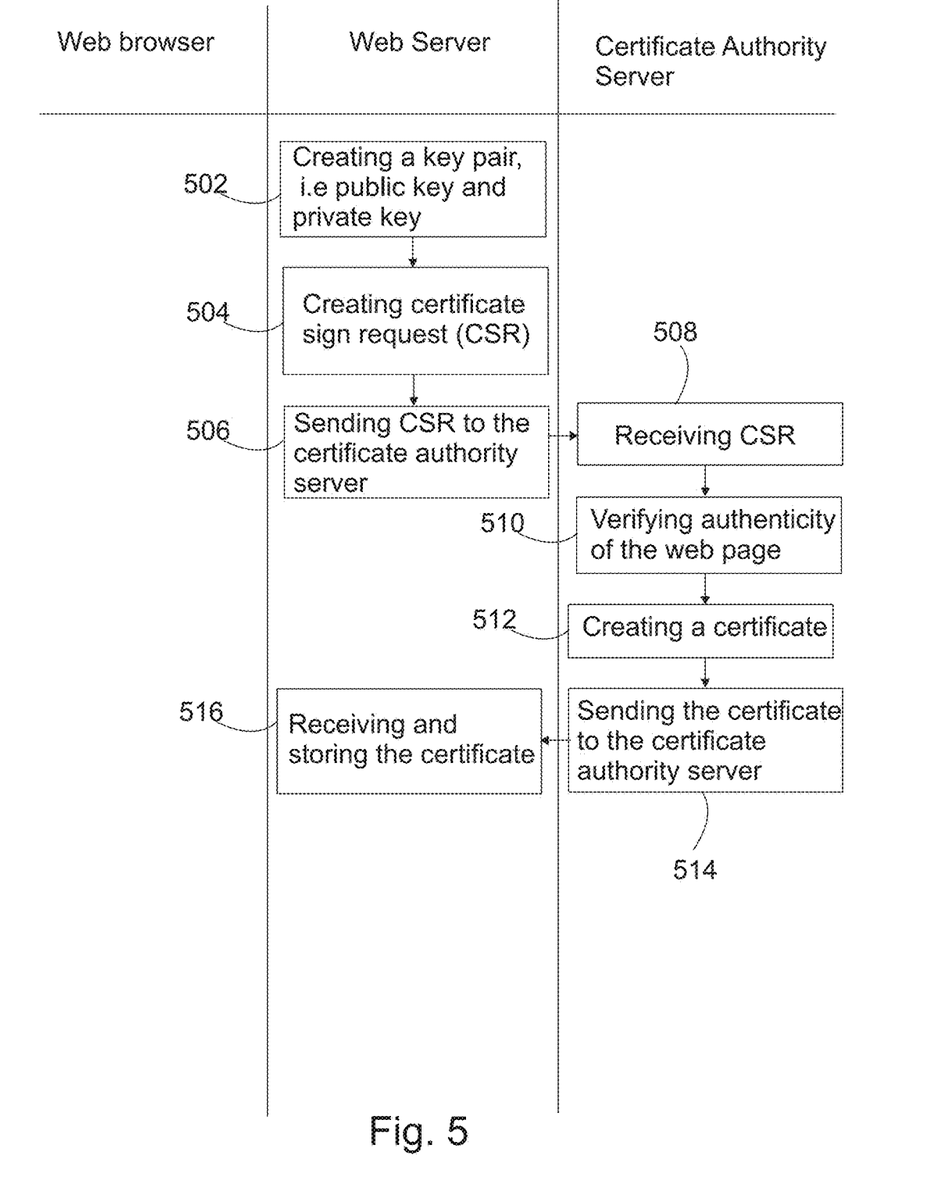
FIG. 5 is a basic process diagram illustrating the steps related to the creation of a certificate in the method according to the invention.
Figure 7:
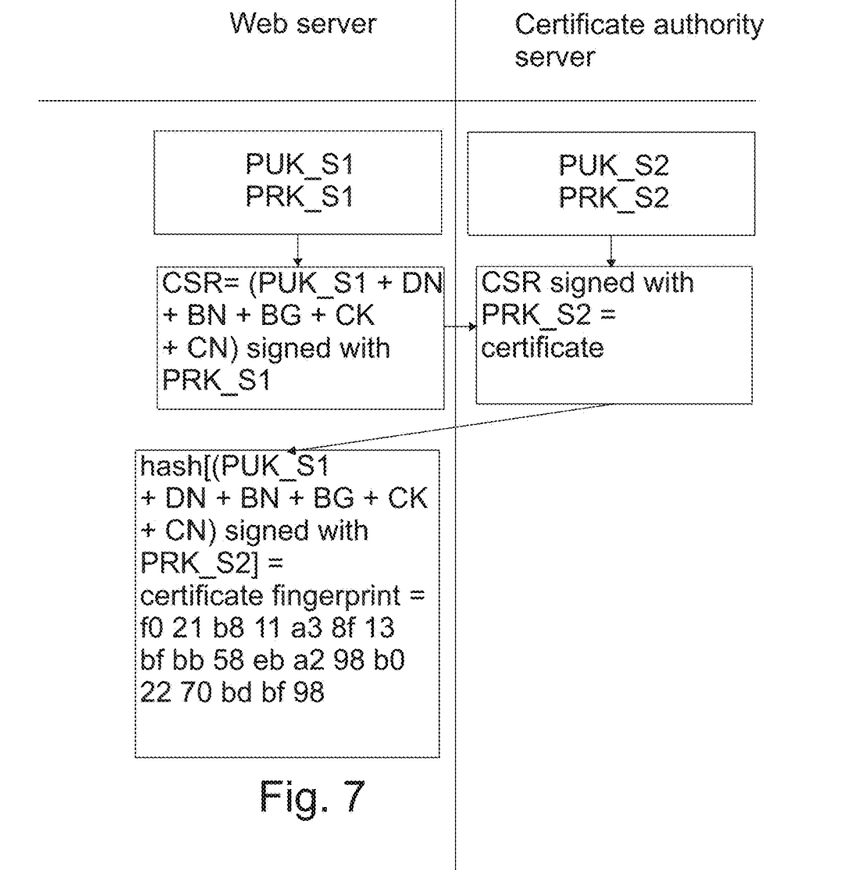
FIG. 7 illustrates the composition of a certificate of different components in the method according to the invention.

In the method according to the invention, the certificate of the website has been brought to the web server before establishing the connection between the website and the user's web browser. To provide an example, below is a description of the creation of a certificate, although it is not a part of the method according to the invention. When creating a certificate, a public key PUK_S1 and a private key PRK_S1 are first generated on a website 14 placed on a web server 12 for encryption using known encryption techniques. The creation of a certificate can be a process according to prior art. FIG. 3 only illustrates the part of the system that is needed for the creation of a certificate. In turn, FIG. 5 illustrates an example of the steps 502-516 for creating a certificate. The asymmetric pair of numbers forming the public key and the private key in public-key encryption algorithms can be selected based on a mathematical connection that is difficult to resolve (for example, factoring or discrete logarithms). Once the pair of numbers has been selected, one of the numbers, i.e. the public key, can be published and it will not endanger the number that must be kept secret, i.e. the private key. After this, the public key PUK_S1 of the website 14 and information about the possessor of the website 14 are sent from the web server 12 to the certificate server 18 of the certificate authority 20 by email, for example, as a request message called CSR (Certificate Signing Request) signed with the private key PRK_S1 of the website 14. The information about the possessor of the website 14 may include, for example, as shown in FIG. 7, the website name DN (Distinguished Name), the name of the organisation managing the website BN (Business Name), geographical location data, such as the city (CT) and the country (CN). The request message is received on the certificate server 18, the validity of the information about the website possessor contained in the request message is checked and a certificate 24 is created on the certificate server 18 of the certificate authority 20 by signing the certificate using the private key PRK_S2 of the certificate authority 20. Advantageously, for signing the certificate, the certificate server has a separate computer, which is not connected to the Internet for ensuring data security and to which the request message can be transferred with a memory stick, for example. Based on the certificate 24, a unique thumbprint 26 of the certificate 24 can be created by generating a check sum of the certificate 24. The certificate 24 is sent from the certificate server 18 of the certificate authority 20 to the web server 12 of the website 14 using, for example, a separate computer via an Internet connection 32, from where the website 14 can always send the certificate to the web browser 30 of the user 100 of the website 14 upon establishment of a 1b connection.

Figure 2B:
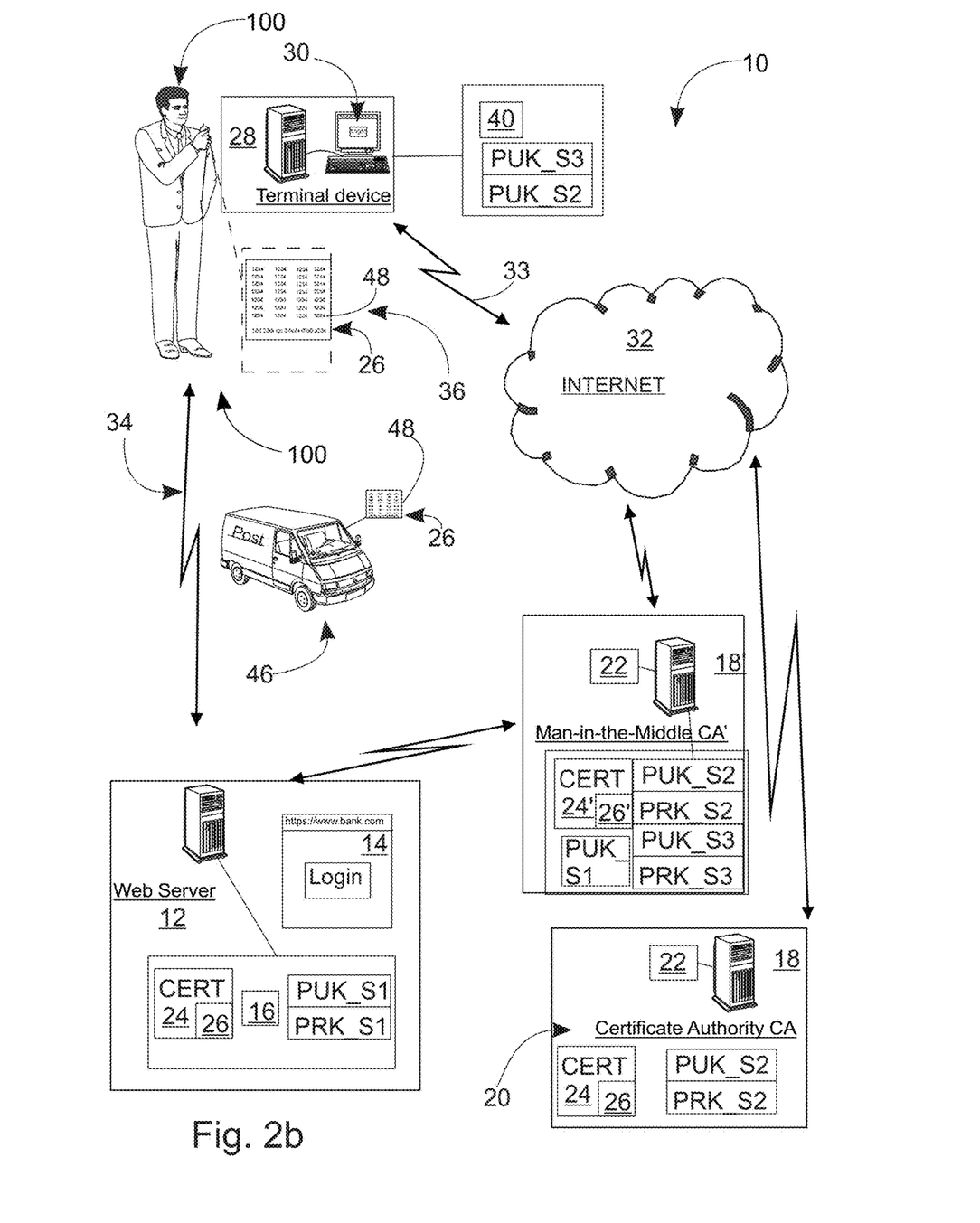
FIG. 2b is a basic view of a second embodiment of the system according to the invention.
Figure 6:
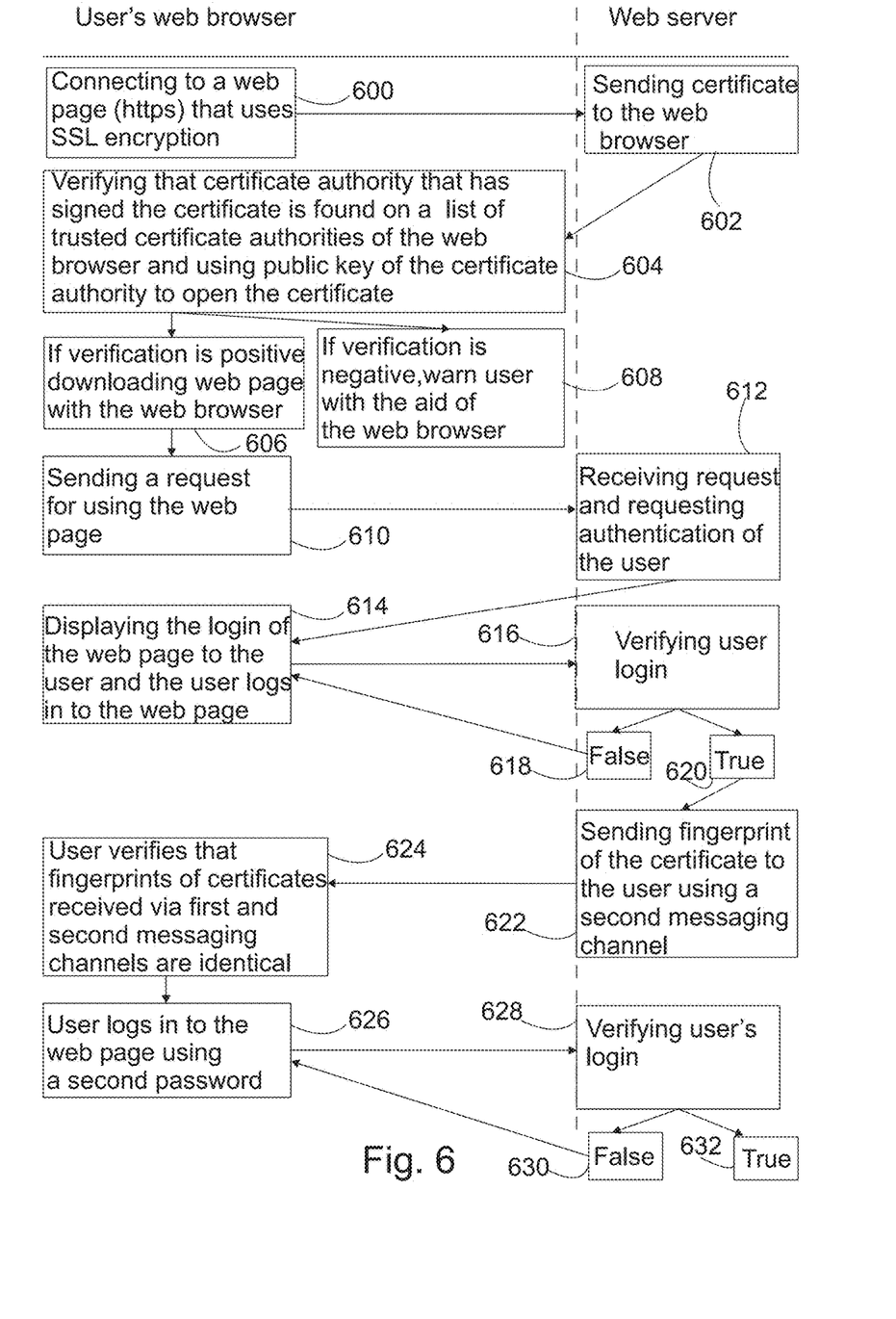
FIG. 6 is a basic process diagram illustrating the steps related to the verification of authenticity of a certificate in the method according to the invention.

Once the certificate 24 has been created, the user 100 must also be registered in the customer register 16 of the website 14 in order that the additional security check key 36 can be sent to the user 100. Upon registration, the user delivers their contact information to the website possessor in order to use the second messaging channel. The contact data are contact data independent of the Internet connection, advantageously, the postal address of the user. Steps 600-632 of FIG. 6 illustrate the verification of the authenticity of the certificate. Referring to FIGS. 2a, 2b and 6, when verifying the authenticity of the certificate 24, a connection is established to the website placed on the web server with the web browser on the user's terminal device via an Internet connection and a request for sending a certificate is sent to the web server 12 of the website 14 with the web browser 30. The certificate 24 is sent from the web server 12 to the web browser 30 of the user via the Internet connection 32. The certificate authority 20 that has issued the certificate 24 is compared against the list 40 of trusted certificate authorities embedded in the web browser 30 and it is verified that the certificate authority 20 that has issued the certificate 24 is found in the list 40. If the certificate authority 20 is not found in the list 40, the web browser 30 displays a warning about the matter to the user 100. If the certificate authority is found in the list, an additional security check key 36 is sent to the user from the web server 12 using a second messaging channel 34, external to the Internet connection 32, and the customer register 16. Apart from the sending of the additional security check key 36, the verification of the authenticity of the certificate 24 takes place completely in the same way as in the most common known methods. According to the invention, the thumbprint 26 of the certificate 24 is sent as an additional security check key 36 via the second messaging channel 36 and this thumbprint 26 can be compared with the thumbprint 26 of the certificate 24 received by the web browser 30 via the Internet connection 32 from the web server 12 for verifying the authenticity of the certificate 24.

If a mediator 18' exists between the website and the user, a fake certificate 24' created by the mediator deviates from the authentic thumbprint 26 regarding its thumbprint 26'. By comparing the thumbprints 26 and 26', the user detects the fake certificate 24'. The difference in the thumbprint of the certificate is caused by the public key of the mediator used by the mediator while creating the certificate, this public key differing from the public key of the website.

The verification of the certificate authority by the web browser is based on the fact that a list of trusted certificate authorities, each of which has sent their own public key to the web browser, has been stored in the web browser already at an earlier stage. The web browser can verify the certificate based on the public key previously sent to the web browser by the certificate authority. However, this is not a sufficient method for verifying the authenticity of a certificate. In addition to this, the thumbprint of the certificate sent via the second messaging channel according to the invention is compared with the thumbprint of the certificate received via the Internet connection. This comparison can take place manually by the user, in which case the user opens up additional data of the certificate using the web browser menus to see the thumbprint of the certificate received via the Internet connection. By visually comparing this thumbprint with the authentic thumbprint of the certificate received, for example, in a text message or a printout, a definitive verification of the authenticity of the certificate can be made. A difference of even one character in the thumbprint of the certificate means that the certificate is not authentic, but rather a fake made by a mediator. Generally, it is sufficient that the user visually checks the last four characters of the certificate to verify the authenticity.

Once the web browser has identified the certificate and when the certificate authority that has issued it is found in the list of trusted certificate authorities, the communication between the website and the user's web browser takes place over an encrypted connection. In an encrypted connection, a general policy is that upon completion of the SSL/TLS handshaking, the web browser generates a new and random one-time key, to be used during this connection only, which is sent to the website encrypted by the public key of the website, in which case only the website can open the message with its private key. Therefore, henceforth, encryption based on the PKI public/private key logic will advantageously no longer be used, but encryption is performed with a symmetric key, as it is a notably lighter method to implement. After this, the website and the web browser can use a symmetric key to encrypt messages. Thus, the user can safely log in to a website, such as to an online bank. The operation of the system and the method according to the invention described above is common to all of the embodiments of the invention. The differences between the different embodiments are described below in more detail.

According to the first embodiment of FIG. 2a, a mobile phone network 38 is used as the second messaging channel 34. The mobile phone network 38 forms a second external messaging channel 34 independent of the Internet connection 32, in which case an attack on the Internet connection will not endanger the authenticity of the additional security check key. Only a simultaneous attack on both the mobile phone network and the Internet connection would enable a takeover of messaging traffic unnoticeably; however, a simultaneous capture of these two messaging channels is notably difficult. Advantageously, the mobile phone network 38 is used for sending a message 44, which is accompanied by the thumbprint 26 used as the additional security check key 36. Thus, the system 10 according to the invention also includes additional components: a second terminal device 42 of the mobile phone network, i.e. a mobile phone, and a modem 50, which is used to send the additional security check key 36 to the mobile phone network 38, fitted in association with the web server 12. The message of the mobile phone network is advantageously an SMS text message, but can also be a voice message or a direct phone connection. The information required for sending the additional security check key must be in the customer register of the web server that maintains the website in order that the user information can be utilised for sending the additional security check key. Advantageously, the web server includes software means for sending the thumbprint of the certificate stored in its memory with a modem as a mobile phone network message to the user's mobile phone network terminal device utilising a customer register. In other words, in an advantageous embodiment, the software means identify the user when the user logs in to the website, retrieve the thumbprint of the certificate from the memory and send it via a modem to the mobile phone subscriber connection, i.e. a telephone number, indicated in the user's contact data in the customer register, preferably in a text message, which can also include a one-time password or other identification related to the user's login process.

The additional security check key according to the invention can always be used for the duration of the validity period of the certificate, after which the thumbprint must be resent to the user as an additional security check key for the verification of the authenticity of the certificate.

According to an embodiment, if both the terminal device of the mobile phone network and the terminal device of the user's web browser are one and the same terminal device, such as a smartphone provided with means for both mobile phone network communication and an Internet connection, an additional security check key sent via the mobile phone network can be used to automatically retrieve a thumbprint from a text message, for example, using a separate additional software component connected to the web browser, and to compare it with the thumbprint of the certificate that has arrived via the Internet connection. In this way, the verification of authenticity of the certificate can also take place automatically without a manual check by the user. However, data security problems may be associated with this embodiment, since the web browser may also be hacked via the Internet connection with malware, in which case the web browser will also authenticate a fake certificate.

Figure 4B:
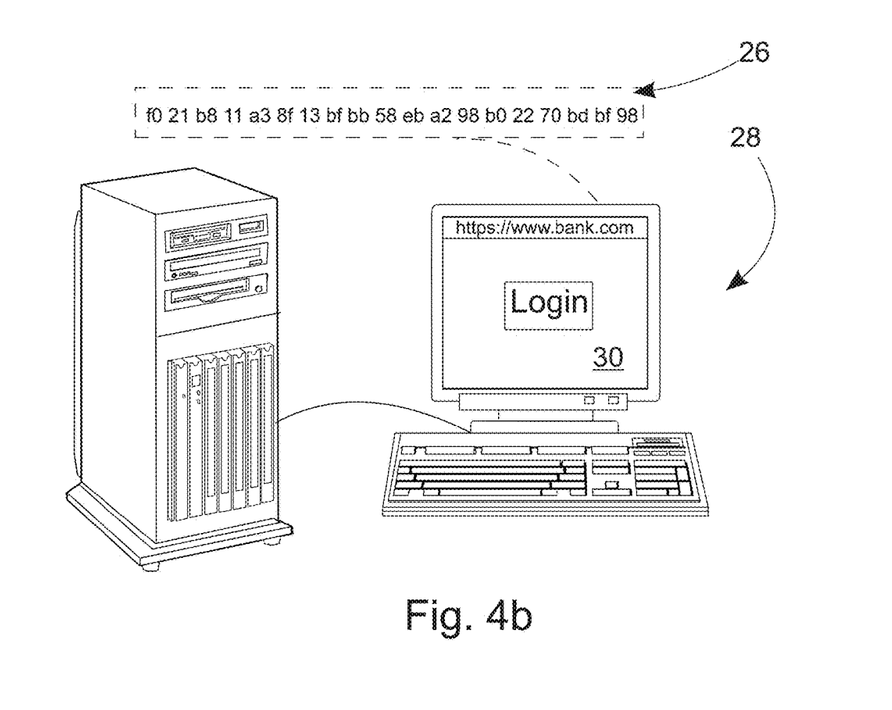
FIG. 4b illustrates the thumbprint of a certificate verified via a web browser of the system according to the invention.

According to the second embodiment of FIG. 2b, a mail delivery 46, via which the user 100 is sent the thumbprint 26 of the certificate 24 in a paper copy, can be used as the second messaging channel 34. In this case, faking the authenticity of the certificate would require, in addition to the capture of the message via the Internet connection, capturing physical mail deliveries, which is notably more easily addressable by local authorities. In addition, the mediator should then know the address data filled in by the user in the customer register. Advantageously, the additional security check key 36 sent via a mail delivery is, for example, a thumbprint 26 of a certificate printed in a key code list 48 of a bank according to FIG. 4a. Thus, it is easy for the user to also verify the authenticity of the certificate when logging in to the online bank based on the authentic thumbprint 26 of the certificate that is visible in the same key code list 48, this thumbprint being in the same printout with the one-time passwords 54 of the online bank. According to FIG. 4b, the thumbprint 26 of the certificate can be displayed in the web browser 30 on the user's terminal device 28, via the menus of which the user can check the thumbprint 26 of the certificate. This feature is included in all of the most commonly used web browsers.

If a thumbprint of a certificate used as an additional security check key is printed in association with the key code list used for user registration, the customer register of the website possessor may include software means for picking up the certificate thumbprint from the memory and adding it to the key code list for printing.

According to an embodiment, a direct contact with the user can also be used as the second channel, for example, during a visit upon which the user is given the thumbprint of the certificate in a printout.

Figure 2C:
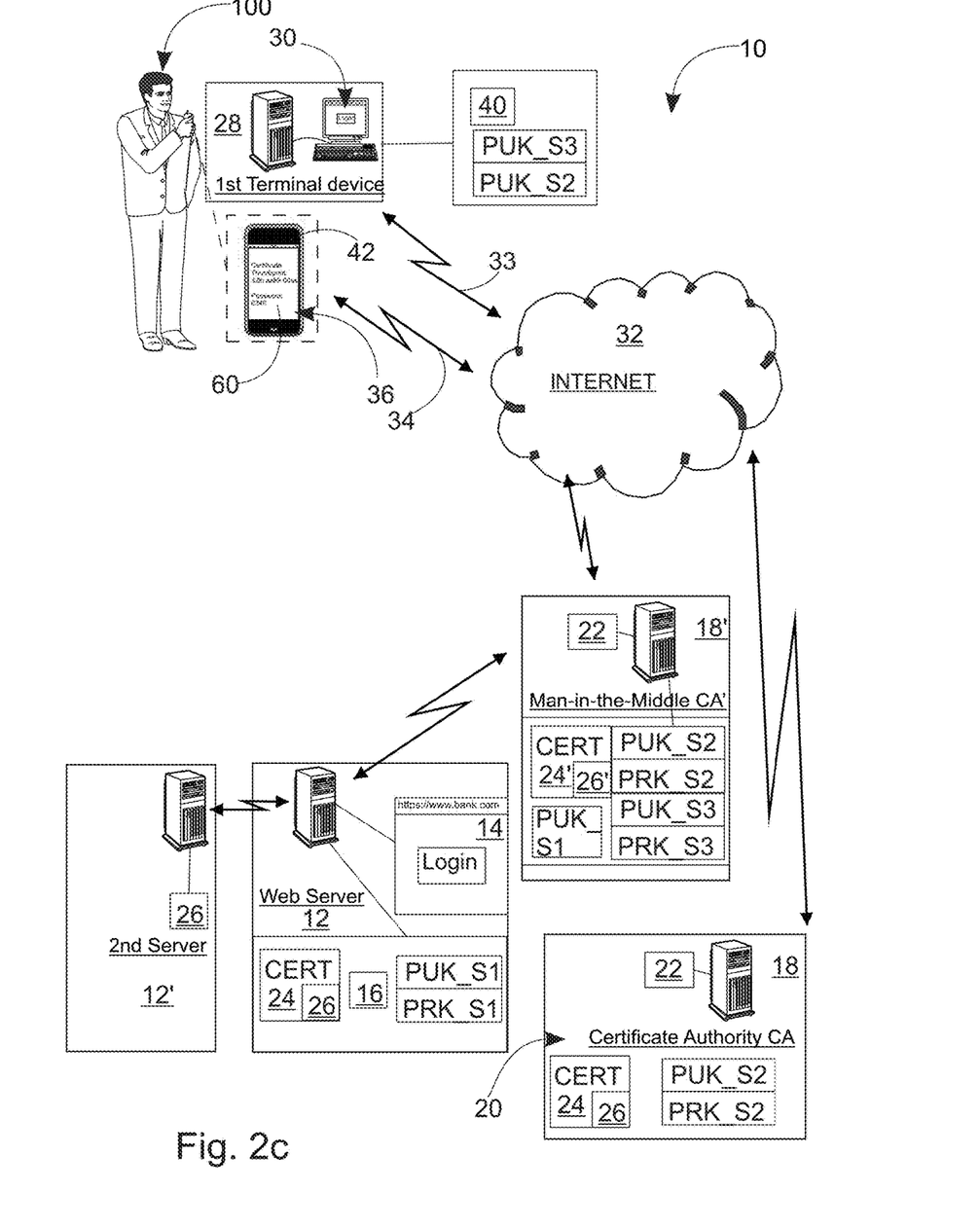
FIG. 2c is a basic view of a third embodiment of the system according to the invention.

According to the third embodiment of FIG. 2c, a software application 60, containing the thumbprint 26 of the certificate 24, can be used as the second messaging channel 34. In this embodiment the system according to the invention includes a second server 12' from where the software application is installed and regularly updated with the thumbprint of the certificate 26, using an encrypted connection. The second server 12' is connected to the web server 12 in order to receive the copy of the thumbprint of the certificate 26. The application can be also used to verify the user's login in to website by using pre-created additional passwords saved in the application or algorithm generating verifiable time related passwords. The system may also include a second terminal device 42 for storing and running the software application 60 so that the user's web browser 30 and the software application 60 are located on two separate terminal devices, namely terminal device 28 and second terminal device 60.

At its simplest form the software application is downloaded from a second server, that is a software server such as Google Play-service, Apple Store or similar. The password application may include preselected passwords, or an algorithm that creates a one-time password based on time (for example, RSA SecurID). Another option is that the software application verifies during installation the owner of the terminal device and from that point onwards uses only PIN login to verify the identity of the user. To summarize, the software application can be downloaded only once from a server or it can be such that it is downloaded again every month or so. In the latter option the software may include the latest thumbprint of SSL certificate.

In the method and the system according to the invention, RSA encryption, for example, can be used for encrypting data communications, wherein the larger key is a 2048-bit key and the smaller key is a 256-bit key. The bit numbers of encryption may vary according to the desired level of encryption, and in the future, notably larger numbers of bits can be used as the computational power increases.

In the case that the web server set forth in this to invention is used for sending a thumbprint of a certificate utilising a mobile phone network, in addition to the method and the system described in this application, it is also possible to talk about an invention of a separate web server for verifying the authenticity of a certificate using the SSL/TLS protocol in an encrypted Internet connection, said web server 12 being arranged to maintain a website 14, said web server 12 having the public key PUK_S1 and the private key PRK_S1 of the website 14 for encryption, a customer register 16 for storing the contact data of users 100 registered in the website 14 and a certificate 24 with a unique thumbprint 26 generated by a certificate authority 20, said web server 12 being arranged to send the certificate 24 signed with the public key PUK_S1 and the private key PRK_S1 to the web browser 30 on a terminal device 28 of a user 100, and said web server 12 including first data transfer means for establishing an Internet connection 32 from the web server 12 to the web browser 30 on the terminal device 30 of the user 100 and vice versa, and second data transfer means for establishing a data transfer connection to a second messaging channel 34, external to the Internet connection 32, and software means, with which the web server 12 is arranged to send the thumbprint 26 of the certificate 24 to the user 100 as an additional security check key 36 based on said customer register 16, using the second data transfer means, via the mobile phone network 38 that functions as the second messaging channel 34 for verifying the authenticity of the certificate 24. Here the second data transfer means may be comprised of a modem.

In this context, it should be understood that the figures only illustrate an example of a narrow spot of the implementation of the method and system according to the invention, which can be varied within the scope set forth in the claims.

The invention claimed is:

1. A method for verifying the authenticity of a certificate in a web browser using an SSL/TLS (Secure Socked Layer/Transport Layer Security) protocol in an encrypted internet connection to an HTTPS (Hypertext Transfer Protocol Secure) website, wherein a web server of the HTTPS website has an SSL certificate provided with a thumbprint issued by a certificate authority governed by a third party, the web server has registered contact data of a user in a customer register and the web browser has a list of trusted certificate authorities, the method comprising:
    establishing an encrypted connection to the HTTPS website placed on the web server with the Internet connection as a first messaging channel using the web browser on the user's terminal device;
    authenticating the user during a first step of a two phase login process to the HTTPS website with steps including:
        sending a certificate including a public key of the HTTPS website and signed by a trusted certificate authority to the user's web browser from the web server using the Internet connection;
        comparing the certificate authority that has signed the certificate against the list of trusted certificate authorities embedded in the web browser;
        and verifying that the certificate authority is included in the list;
    and authenticating the user during a second step of the two phase process to the HTTPS website after completing the verifying the certificate authority with steps including:
        sending the thumbprint of the certificate as an additional security check key from the web server using a second messaging channel, external to the Internet connection between HTTPS website and web browser of the user's terminal device, and the contact data in the customer register based on the first step of the two phase login process;
        comparing the additional security check key with the thumbprint received by the web browser from the web server via the Internet connection for verifying the authenticity of the certificate; and
        generating the certificate on a certificate server utilizing the private key of the certificate server and the public key of the HTTPS website.

2. The method according to claim 1, wherein the sending the thumbprint includes using a user's mobile phone network as the second messaging channel.

3. The method according to claim 2, wherein the sending the thumbprint includes sending the additional security check key to the user's mobile phone network terminal device as a mobile phone network message after the user has logged in.

4. The method according to claim 1, wherein the sending the thumbprint includes using a mail delivery as said second messaging channel.

5. The method according to claim 4, wherein the sending the thumbprint includes sending said additional security check key to the user via a mail delivery before the user has logged in as part of a key code list, which is required for the user's login to the HTTPS website.

6. The method according to claim 1, wherein the sending the thumbprint includes using a software application separate from the web browser as said second messaging channel.

7. A system for verifying the authenticity of a certificate in a web browser using the SSL/TLS (Secure Socked Layer/Transport Layer Security) protocol in an encrypted Internet connection with an HTTPS (Hypertext Transfer Protocol Secure) website, said system including:
    a user's terminal device comprising a web browser for browsing HTTPS websites;
    a web server for maintaining an HTTPS website, said web server having a public key of the HTTPS website and a private key of the HTTPS website for identifying the HTTPS website, a certificate with a unique thumbprint created by a trusted certificate authority governed by a third party, and a customer register for storing contact data of users independent of the Internet connection between the HTTPS website and web browser of the user's terminal device, said web server being arranged to send a certificate including a public key and signed by the certificate authority to the web browser on the user's terminal device, the HTTPS website having a two phase login process with a first phase for authenticating the user before an authenticity verification of the certificate and a second phase for authenticating the user after completing the verification of authenticity of the certificate;

an encrypted Internet connection for connecting the web server to the web browser on the user's terminal device and vice versa as a first messaging channel; and a second messaging channel external to the Internet connection for sending an additional security check key, said additional security check key comprising the thumbprint of the certificate for verifying the authenticity of the certificate;

a certificate server generating the certificate utilizing the private key of the certificate server and the public key of the HTTPS website;

wherein said web server is arranged to send the additional security check key on the second messaging channel to the user based on the user data in said customer register, and wherein the contact data of users is related to said second messaging channel.

8. The system according to claim 7, wherein the second messaging channel comprises a mobile phone network.

9. The system according to claim 8, wherein the system further includes a modem arranged in association with the web server for sending a mobile phone network message that includes an additional security check key from the web server to the user's mobile phone network terminal device.

10. The system according to claim 7, wherein said second messaging channel is a mail delivery.

11. The system according to claim 7, wherein said system further comprises a second server connected to said web server and a software application separate from the web browser wherein said second server and said software application are arranged to form a second messaging channel.

12. The system according to claim 11, wherein said system further comprises a second terminal device of the user for storing and using of said software application.

* * * * *